United States Patent [19]

Faerber et al.

[11] Patent Number: 5,022,558
[45] Date of Patent: Jun. 11, 1991

[54] ARRANGEMENT FOR THE SUPPLY AND METERED DISPENSING OF LIQUIDS

[76] Inventors: Karlheinz Faerber, Giegerweg 1, 7928 Gien/Gen Brenz; Anton Deininger, Vogstrasse 20, 8887 Bach Hagel; George Plester, Rheinstrasse 79, 18; Manfred Guenther, Elfriedenstrasse 14 d, both of 4300 Essen, 1; Georg Troska, Erlenstrasse 23, 4352 Herten, all of Fed. Rep. of Germany

[21] Appl. No.: 189,827

[22] Filed: May 3, 1988

[51] Int. Cl.⁵ ............................................. B65D 35/56
[52] U.S. Cl. .................................. 222/105; 222/147; 222/476; 222/541
[58] Field of Search ............ 222/94, 105, 129.1-129.4, 222/183, 185, 504, 147, 83, 83.5, 87, 476

[56] References Cited

U.S. PATENT DOCUMENTS

| | | | |
|---|---|---|---|
| 4,076,147 | 2/1978 | Schmit | 222/105 X |
| 4,375,864 | 3/1983 | Savage | 222/105 X |
| 4,667,853 | 5/1987 | Kruger . | |
| 4,709,835 | 12/1987 | Kruger | 222/87 |
| 4,723,688 | 2/1988 | Munoz | 222/105 X |
| 4,893,731 | 1/1990 | Richter | 222/105 X |

Primary Examiner—Michael S. Huppert
Assistant Examiner—Gregory L. Huson
Attorney, Agent, or Firm—Birch, Stewart, Kolasch & Birch

[57] ABSTRACT

An apparatus for the metered dispensing of beverage concentrate includes a storage container with a discharge opening and a dosing chamber assembly attached to the discharge opening. The dosing chamber assembly includes a chamber housing with an input opening communicating with the discharge opening of the container, an output opening and a sliding control valve displaceable in the chamber to alternately open and close the input and output openings of the chamber housing. The container includes an outer rigid shell and a flexible foil bag therein which varies in volume with pressure changes therein.

23 Claims, 2 Drawing Sheets

ARRANGEMENT FOR THE SUPPLY AND METERED DISPENSING OF LIQUIDS

BACKGROUND OF THE INVENTION

The present invention relates to an arrangement for the storing and metered dispensing of liquids, in particular beverage concentrates, by means of a storage vessel for liquids, at the dispensing opening of which, located at the bottom when in the operating position, there is positioned a dosing chamber/dispensing fixture having input- and output-side discharge openings that can be closed alternately by a sliding control valve displaceable in the dosing-chamber housing.

As an example, these arrangements are preferably used in beverage dispensers, by means of which carbonated water is mixed with beverage concentrates for a refreshment drink. Storage vessels for the beverage concentrates are usually fabricated from a dimensionally stable and gas-tight material, and are shaped like a bottle or cuboid. When installed in a beverage dispenser, these storage vessels are positioned with their discharge opening downward. Attached to this discharge opening is a dosing chamber/dispensing fixture with input- and output-side discharge openings that can be closed alternately by means of a sliding control valve. The liquid (beverage concentrate) flows by gravity from the storage vessel into the dosing chamber/dispensing fixture, when that fixture's input-side discharge opening is opened. When this input-side discharge opening is closed by the sliding control valve and, at the same time, the output-side discharge opening is opened, the liquid—likewise by gravity—emerges from the dosing system, so that the quantity of liquid is essentially determined by the dosing-chamber capacity.

In the prior art dosing chamber/dispensing fixtures, however, leakages between the sliding control valve and the dosing-chamber housing can influence the quantity dispensed in a manner difficult to control. Design of a guideway between the sliding control valve and the dosng-housing, which is as free of gaps as possible to avoid these leakage flows, is highly problematical, since this sliding control valve is supposed to be axially movable with the greatest possible ease inside the dosing-chamber housing, so it can be reliably adjusted, in the form of a solenoid plunger, by an electrically generated magnetic field. This method of adjustment requires no mechanical linkages, so that replacement of the dosing chamber/dispensing fixtures in the beverage dispenser, together with the storage vessels, can be carried out with ease.

It is possible to ventilate the head room of this storage vessel or a buffer space therewithin (DE OS 25 44 671) in order to ensure that the flow of liquid is not hampered by volume-equalizing air counterflows and by the subatmospheric pressure developing. These measures require additional technical effort, yet they have not proven to be advantageous, since the air in the head room of the storage vessel easily escapes therefrom to enter the head room of the storage vessel during the flow of the liquid. In the prior art systems, it has even been found expedient to cause a build-up of subatmospheric pressure in the head room so as to counteract the leakage between the dosing plunger and the wall of the dosing-chamber housing.

Also, for reasons having to do with transport and for ease of handling, it has proven very advantageous to make the storage vessel for beverage concentrates of a material that is dimensionally stable. However, such storage vessels are relatively expensive and troublesome with respect to waste disposal, all the more so since the vessels can be used only once and are then discarded. The convenience of using the storage vessel only once is based on reasons of hygiene, but also because of steps taken to prevent the use of a refilled storage vessel. Precautionary steps are taken by adopting appropriate measures in the area of the dispensing opening of the storage vessel.

SUMMARY OF THE INVENTION

Accordingly, the aim of the invention is to reduce the production cost particularly for these storage vessels and to overcome the waste disposal problems thereof without impairing their ease of handling. The arrangement for the storing and metered dispensing of liquids is also to be improved in terms of reliability.

An arrangement which satisfies these requirements is characterized, in accordance with the invention, by forming the storage vessel from a gas-impermeable and essentially flexible foil bag and an essentially dimensionally stable, air-permeable vessel wall which surrounds the flexible foil bag in a cuboidal configuration, and by attaching the flexible film bag and the essentially dimensionally stable vessel wall to a connecting pipe socket forming the dispensing opening and with which the dosing chamber/dispensing fixture can be connected. Preferably, this vessel wall is made of a fiberboard carton and in a box-type configuration.

A storage vessel constructed according to these novel features is distinguished by the fact that the flexible and gas-impermeable foil bag, which can be made of inexpensive material, e.g., an aluminum-clad foil, provides adequate protection against the environment for the liquid contained therein, especially for beverage concentrate, and that the essentially dimensionally stable storage wall, which can be made of a cheaper material, e.g., fiberboard carton, provides adequate protection against mechanical damage of this foil bag and also affords the possibility of ease of handling of the storage vessel. In particular, from the viewpoint of production engineering, it is advantageous to indirectly attach the dimensionally stable storage wall to the connecting pipe socket of the storage vessel by means of the foil bag. By linking the connecting pipe socket to the essentially dimensionally stable storage wall, the entire storage vessel can be given the strength needed for a trouble-free mounting and attachment of a dosing chamber/dispensing fixture to the connecting pipe socket of the storage vessel.

In order, on the one hand, to afford the possibility of carrying out the volume metering by means of the dosing chamber/dispensing fixture in accordance with the nature of the liquid stored in the storage vessel and, on the other hand, to provide protection against improper use of the storage vessel, it is advantageous to integrate a part of the dosing chamber/dispensing fixture, namely the input-side area, into the connecting pipe socket of the storage vessel through the discharge opening that can be closed by the regulator piston. This area is so designed that, once connected to the main parts of the dosing chamber/dispensing fixture, it is no longer usable. Before connecting these dosing chamber components, the dispensing opening of the connecting pipe socket is firmly closed with a foil cover.

If the flexible foil bag is not bonded to the dimensionally stable vessel wall, the problem arises that no well-defined pressure difference relative to the outside atmosphere can develop in the storage vessel. This makes it difficult to use the prior art dosing chamber/dispensing fixtures, since the leakage of the liquid to be metered by these known dispensers cannot be prevented by the subatmospheric pressure in the storage vessel.

For this reason, it is advisable to provide an arrangement for the storing and metered dispensing of liquids with a dosing chamber/dispensing fixture in which a tubular sliding control valve, arranged to be movable in a longitudinal direction, with a solenoid plunger of a solenoid plunger/electromagnet system, said solenoid plunger being integrated into the tube wall, and which is characterized by the fact that the input-side discharge opening is placed in the center of the dosing chamber/dispensing fixture in the head room of said closing chamber/dispensing fixture, and that opposite this discharge opening on the tubular control valve there is positioned a valve-closing disc, by means of which the discharge opening can be closed in lid fashion, in the direction of movement of the sliding control valve, against the whole interior of the dosing chamber housing. By using this technique, it is practically certain that a liquid from the storage vessel will continue to flow across uncontrollable leakage flows. The pressure in the storage vessel will no longer have any effect whatever on the quantity of liquid being dispensed. The dispensed liquid depends solely on the actual volume defined by the housing of the dosing chamber.

Often it is necessary, or only useful, to cool vessels for beverage concentrates in a beverage dispenser. As a rule, the cooling phases occur intermittently. The temperature in the storage vessel fluctuates during the intermittent cooling phases contingent upon the measuring and cooling technologies. This can cause pressure fluctuations in storage vessels designed with dimensional stability. By using flexible foil bags for receiving the liquids dispensed in measured portions, volume equalization is provided to prevent significant variations of the inner pressure in the storage vessel. However, the special design of the proportioning chamber/dispensing fixture with the input-side discharge opening located in the center of the head room and closable in lid fashion by the valve-sealing disc of the sliding control valve also makes certain that the pressure differences within the storage vessel will not have any effect on the metered quantities.

According to a preferred embodiment, the dosing chamber/dispensing fixture of the arrangement incorporating the invention is characterized by the mounting, on the valve-sealing disc, of guide ribs that project into the input-side discharge opening of this dosing chamber/dispensing fixture. This lengthens in an axial direction the guideway for the sliding control valve to the input-side discharge opening of the dosing chamber/dispensing fixture.

According to another preferred embodiment, longitudinally directed guide ribs are mounted between the outer jacket of the tubular sliding control valve and the cylindrical wall of the dosing chamber/dispensing fixture. Thereby, the gap between the sliding control valve and the wall of the dosing-chamber housing can be enlarged sufficiently without the risk of tipping the sliding control valve in the dosing chamber, thereby reducing the friction between this sliding control valve and the dosing-chamber housing. From a production viewpoint, it is advantageous to install the longitudinally directed guide ribs on the outer jacket of the tubular sliding control valve.

It is desirable that the main components of the dosing chamber/dispensing fixture be standardized and that the working stroke of the sliding control valve be made of uniform length as well. This step is of great importance for use in beverage dispensers, in which a magnetic flux generated by an electromagnet system in the apparatus housing controls the sliding control valve actuated as a solenoid plunger. By standardizing the components and making the working strokes of uniform length, the magnetic flux to be generated can be standardized as well. Nevertheless, there must be an option to meter differing quantities of liquids on account of the different natures of the liquids to be metered, namely, the different beverage concentrates. Depending on the particular type of beverage concentrate used, different mixing ratios are required with the other component, namely, the carbonated water.

To obtain these differing metered quantities, and nevertheless to be able to fall back on a dosing system that is as standardized as possible, it is advisable, within the scope of the invention, to design the system in such a way that the input-side discharge opening lies in a dosing-chamber cover detachably fixed to the dosing chamber/dispensing fixture with side walls that surround the inner volume. Without requiring the stroke range of the sliding control valve to be changed, the inner volume of the whole dosing chamber/dispensing fixture can be variably and properly adjusted according to the concentrate used by appropriately expanding or contracting the shapes of these side-wall areas. If the housing cover of the dosing chamber/dispensing fixture is structurally integrated into the connecting pipe socket of the vessel for liquids, a direct relationship is achieved between the kind of beverage concentrate and the metered quantity.

BRIEF DESCRIPTION OF THE DRAWINGS

Details of the design incorporating the invention will now be described, reference being had to the practical embodiment shown in the drawing, in which.

DETAILED DESCRIPTION OF PREFERRED EMBODIMENTS

Figure 1:
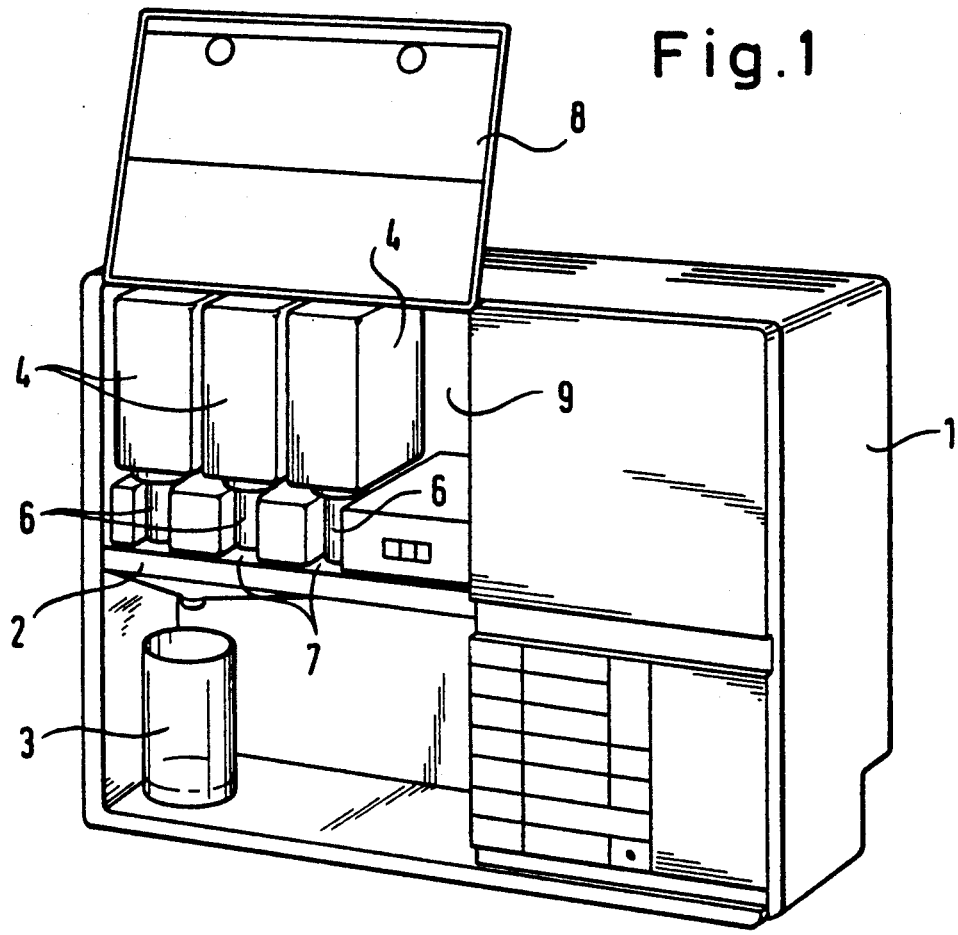
FIG. 1 is a perspective view of a beverage dispenser with storage vessels for beverage concentrates.

The beverage dispenser depicted in FIG. 1 serves to mix water, stored in the apparatus housing, enriched with $CO_2$ gas and cooled, with a beverage concentrate within a mixing trough 2, and to dispense the resulting refreshment drink into a drinking vessel 3. To enable production of different sorts of refreshment drinks, in the present instance three types of beverage concentrates are stored in three storage vessels 4 installed in the beverage dispenser above the mixing trough 2, such that the dispensing openings are directed downwards.

On a connecting pipe socket 5, each of these storage vessels 4 is assigned a dispensing opening of a dosing chamber/dispensing fixture 6. This dosing chamber/dispensing fixture contains a sliding control valve provided with a ferromagnetic armature. In the housing 1 are installed electromagnets which can generate a magnetic field in the area of the locating slot 7 for the dosing chamber/dispensing fixture 6, through which the sliding control valve is influenced inside the dosing chamber/dispensing fixture. Thereby, a metered serving of beverage concentrate is fed to the mixing trough 2, in which the mixing process takes place, with carbonated water likewise metered into the mixing trough 2. The housing chamber 9 which can be closed with a cover 8 and in which the storage vessels 4 are accommodated, is connected to the refrigerating circuit of a refrigerating plant, so that the beverage concentrates are stored chilled and thus stand ready for the mixed drink.

Figure 2:
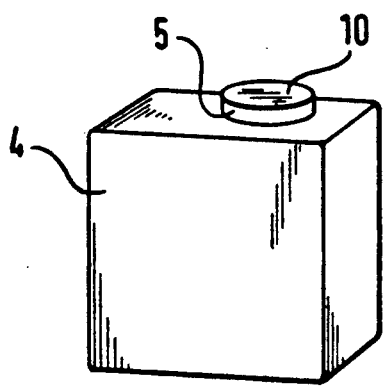
FIG. 2.
Figure 3:
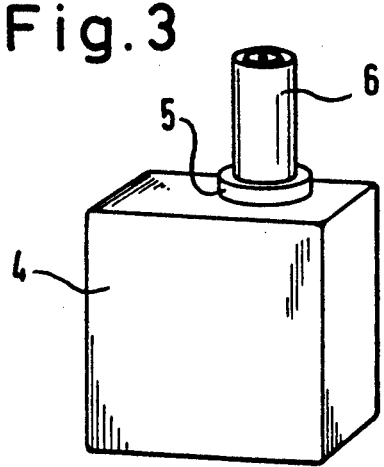
FIG. 3 are perspective views of storage vessels for liquids with and without a dosing chamber/dispensing fixture.

FIG. 2 shows a storage vessel 4 for liquid concentrates as it is transported from filler to user. The dispensing opening in the connecting pipe socket 5 is sealed by a foil cover 10. FIG. 3 shows a storage vessel 4 for a beverage concentrate with the dosing chamber/dispensing fixture mounted on the connecting pipe socket 5.

Figure 4:
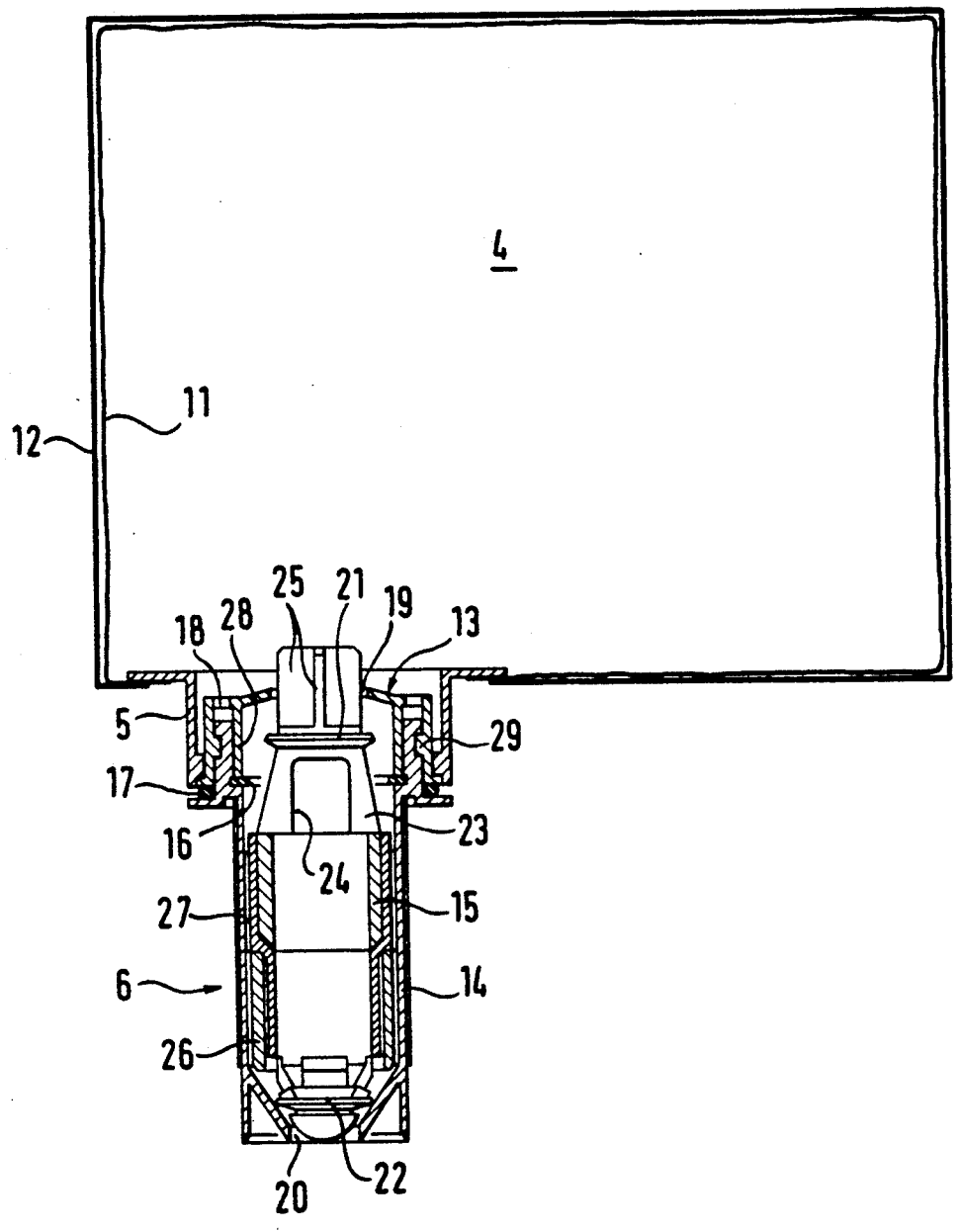
FIG. 4 is a sectional elevational view of a storage vessel for beverage concentrates with a dosing chamber/dispensing fixture attached thereto.

The storage vessels 4 and details of the dosing chamber/dispensing fixture for beverage concentrates are apparent from the cutaway view shown in FIG. 4. The storage vessel 4 consists of a foil bag 11 with substantially flexible walls. These walls of the foil bag 11 are firmly attached in a annular configuration to the connecting pipe socket 5 of the storage vessel 4. This foil bag is surrounded by essentially dimensionally stable, air-permeable vessel walls 14 in a cuboidal configuration as shown in FIGS. 2 and 3. The material for the vessel walls 12 is preferably a fiber-board carton. These walls 12 form a unit and are likewise attached to the connecting pipe socket 5 of the storage vessel 4 via the walls of the foil bag 11.

The dosing chamber/dispensing fixture 6 is formed by an input-side dosing-chamber housing 14 widened out with a housing cover 13 and in which is mounted a tubular sliding control valve 15, which is vertically adjustable.

The housing cover 13 is a component of the connecting pipe socket 5 of the storage vessel 4 integrated into the mounting system. The housing 14 of the dosing chamber/dispensing fixture is attached to the housing cover 13 by short screw threads 29 distributed along the circumference and sealed by a packing plate 16 against this housing cover 13. The seal ring 17 is provided for sealing against the outside atmosphere because, for production engineering reasons, openings 18 are provided in the upper closure wall of the housing cover 13 for cutting the screw threads 25.

In the dosing chamber/dispensing fixture 6 with the substantially rotationally symmetrical design, the input-side discharge opening 19 is arranged axially central in the housing cover 13 and the output-side discharge opening 20 at the lower end of the dosing-chamber housing 14. Opposite these discharge openings 19 and 20, there are supported on the sliding control valve 15 valve-sealing discs 21 and 22, which alternately close the input-side discharge opening 19 or, as shown in FIG. 4, the output-side discharge opening 20, depending on the vertical end position of the sliding control valve 14. The sliding control valve 15 has a substantially tubular form and supports an input-side valve-sealing disc 21 in a cylindrical attachement 23 with holes 24. There project above this valve-sealing disc 21 cross-shaped guide ribs 25 as guiding elements into the input-side discharge opening 19. The sliding control valve 15 has a ring 26 of ferromagnetic material which, as a solenoid plunger inside an electromagnet system installed in the apparatus housing, is influenced by induction of a magnetic field such that the sliding control valve is lifted off the position shown, in which the output-side discharge opening 20 is closed, to the upper position, in which the input-side discharge opening 19 is closed. On the peripheral surface of the sliding control valve 15 there are arranged longitudinally extending guide ribs 27, so that good anti-friction properties are provided between the sliding control valve 15 and the wall of the dosing-chamber housing 14.

In the position of the sliding control valve 15 shown in FIG. 4, beverage concentrate stored in storage vessel 4 can flow into the interior of the dosing chamber/dispensing fixture 6 through the input-side discharge opening 19, due to its own gravity. The air volume present in the dosing chamber/dispensing fixture 6 flows into the storage vessel 14. Due to the fact that this inflowing air is originally hotter than the normally cooled beverage concentrate being dispensed, a volume deficit develops after this air is cooled. Since the wall 11 of the foil bag is flexible and the dimensionally stable wall does not seal this foil bag hermetically, this volume deficit is taken care off even by slightly bagging this foil bag, so that there is no subatmospheric pressure in the storage vessel 4. Likewise, due to the flexibility of the foil bag 11, temperature differences, and thereby volume changes in the storage vessel 4, are equalized by intermittent cooling processes.

By creating a magnetic field with an electromagnet system installed in the apparatus housing 4, a lifting power is exerted on the ferromagnetic ring 26 of the sliding control valve 15. As a result, the input-side discharge opening 19 is closed by the valve-sealing disc 21, so that no more beverage concentrate can get to the dosing chamber/dispensing fixture 6 from the storage vessel 4, while the output-side discharge opening 20 is opened and the quantity of beverage concentrate found originally in the dosing chamber/dispensing fixture 6 can emerge. Again, the volume flowing out is replaced by air in the dosing chamber/dispensing fixture 6. By means of this dosing chamber/dispensing fixture 6, a high degree of accuracy is achieved in the dispensed volume. This accuracy is of the greatest importance in achieving an optimum mixture ratio with the carbonated water which is also introduced in measured portions into the mixing trough 2.

Figure 5:
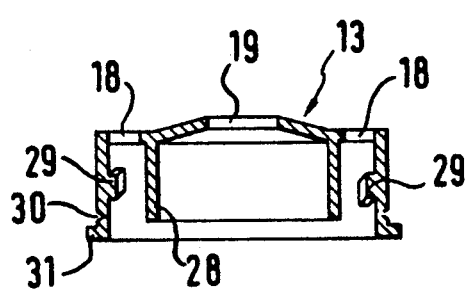
FIG. 5.
Figure 6:
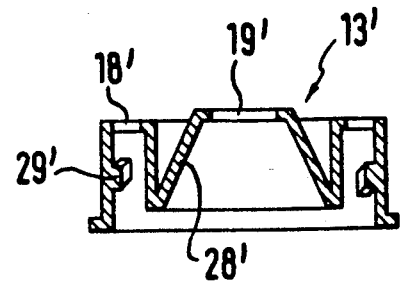
FIG. 6 are various designs of input-side housing covers for the dosing chamber/dispensing fixture.

Different beverage concentrates require different dosing quantities. In order to meet this requirement, with a dosing chamber/dispensing device which is standardized with the essential structural parts, the technical effort for producing the different variants is reduced to the different shapes of the side walls 28 of the housing cover 13. FIG. 5 shows the same housing cover 13 as in FIG. 4, while FIG. 6 shows a housing cover 13' with beveled walls 28', which taper off toward the discharge opening 19'. Thus, compared to the use of the housing cover 13 shown in FIG. 5, if the housing cover 13' is constructed as in FIG. 6, a volume change will result in this area and, thereby, for the whole dosing chamber/dispensing fixture 6. Since these housing covers 13 or 13' are integrated into the connecting pipe socket 5 of the vessel 4, a direct relationship is achieved with respect to the nature of the beverage concentrate used. Further volume reduction in the dosing chamber/dispening fixture 6 is possible by introducing an additional pipe inlet into the regulator plunger.

After removal of the dosing-chamber housing 14 from the housing cover, rupture joints 30 serve to separate the housing cover from its flange 31, thus rendering it unreliable for further coupling.

The use of rupture joints are known in the art and can be seen, for example, in U.S. Pat. No. 4,667,853 to Kruger issued on May 26, 1987. Rupture points or webs 23 in Kruger are shown in FIGS. 6-9 thereof and include preset breaking points which are destroyed when a metering valve housing contacts a functional area element. The patent to Kruger is incorporated herein by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for the metered dispensing of beverage concentrates from a storage container having a discharge opening located in the bottom of the container when in a dispensing position, comprising:
   a dosing chamber assembly including a chamber housing having only two openings including an input opening communicating with the discharge opening of the container and an output opening, whereby the chamber housing defines a predetermined volume for metering a beverage concentrate;
   a sliding control valve displaceable in the chamber housing of said dosing chamber assembly to alternately open and close the input and output openings of the chamber housing, wherein said input opening of said chamber housing is disposed at the top thereof concentric with the longitudinal axis thereof, and said sliding control valve includes a tubular slide opening and a disc which seals off the entire chamber housing from the interior of said bag when said input opening is closed thereby, and guide ribs extending upwardly from said disc into the input opening of said chamber housing, said guide ribs slidably engaging walls of said input opening;
   said container including a gas-impermeable and substantially flexible bag disposed within a substantially dimensionally stable outer shell; and
   socket means having a first open end coupled to both said bag and said shell and a second open end for receiving said dosing chamber assembly.

2. The apparatus of claim 1 wherein said socket means is connected to said outer shell via said bag.

3. The apparatus of claim 1 wherein said outer shell is a fiberboard carton.

4. The apparatus of claim 1 wherein said outer shell surrounds said bag in a cuboidal configuration.

5. The apparatus of claim 4 wherein said socket means is connected to said outer shell via said bag.

6. The apparatus of claim 1 further including longitudinally-directed guide ribs between an outer wall of said tubular slide and an inner wall of said chamber housing.

7. The apparatus of claim 6 wherein said longitudinally-directed guide ribs are provided on said outer wall of said tubular slide.

8. The apparatus of claim 1 wherein said input opening of said chamber housing is disposed in a housing cover which is detachably connected to said chamber housing.

9. The apparatus of claim 8 wherein interior walls of said housing cover are shaped in accordance with the volume of the liquid contained therein to be metered.

10. The apparatus of claim 8 wherein said housing cover includes rupturable joint means connecting the housing cover to a housing cover flange member, said joint means being ruptured subsequent to the removal of the dosing chamber assembly from the housing cover flange member.

11. An apparatus for the metered dispensing of beverage concentrates from a storage container having a discharge opening located in the bottom of the container when in a dispensing position, comprising:
   a dosing chamber assembly having a chamber housing having only two openings including an input opening communicating with the discharge opening of the container and an output opening, whereby the chamber housing defines a predetermined volume for metering a beverage concentrate;
   a sliding control valve displaceable in the chamber housing of said dosing chamber assembly to alternately open and close the input and output openings of the chamber housing thereby metering an amount of beverage concentrate, wherein said sliding control valve includes a disc, and guide ribs extending upwardly from said disc into the input opening of said chamber housing, said guide ribs slidably engaging walls of said input opening and said disc selectively sealing said input opening;
   said container including a gas-impermeable and substantially flexible foil bag disposed within a substantially dimensionally stable outer shell; and
   socket means having a first open end coupled to both said bag and said shell and a second open end for receiving said dosing chamber assembly.

12. The apparatus of claim 11, wherein said socket means is connected to said outer shell via said bag.

13. The apparatus of claim 11, wherein said outer shell is a fiberboard carton.

14. The apparatus of claim 11, wherein said outer shell surrounds said bag in a cuboidal configuration.

15. The apparatus of claim 14, wherein said socket means is connected to said outer shell via said bag.

16. The apparatus of claim 11, further including longitudinally-directed guide ribs between an outer wall of said tubular slide and an inner wall of said chamber housing.

17. The apparatus of claim 16, wherein said longitudinally-directed guide ribs are provided on said outer wall of said tubular slide.

18. The apparatus of claim 11, wherein said input opening of said chamber housing is disposed at the top thereof concentric with the longitudinal axis thereof, and said sliding control valve further comprises a tubular slide and said disc is located at the top thereof to selectively open and close said input opening and seal off the entire chamber housing from the interior of said bag when in the input opening closed position.

19. The apparatus of claim 18, further including longitudinally-directed guide ribs between an outer wall of said tubular slide and an inner wall of said chamber housing.

20. The apparatus of claim 19, wherein said longitudinally-directed guide ribs are provided on said outer wall of said tubular slide.

21. The apparatus of claim 18, wherein said input opening of said chamber housing is disposed in a housing cover which is detachably connected to said chamber housing.

22. The apparatus of claim 21, wherein interior walls of said housing cover are dimensioned in accordance with the volume of the liquid to be contained therein.

23. The apparatus of claim 21, wherein said housing cover includes rupturable joint means connecting the housing cover to a housing cover flange member, said joint means being ruptured subsequent to the removal of the dosing chamber assembly from the housing cover flange member.

* * * * *